United States Patent
Lee et al.

(10) Patent No.: US 7,400,466 B2
(45) Date of Patent: Jul. 15, 2008

(54) METHOD AND APPARATUS FOR DRIVING SPINDLE MOTOR USING ADAPTIVE FEEDFORWARD CONTROL

(75) Inventors: Kang-seok Lee, Suwon-si (KR); Kyoung-whan Oh, Seoul (KR); Cheol-hoon Park, Suwon-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 134 days.

(21) Appl. No.: 11/509,614

(22) Filed: Aug. 25, 2006

(65) Prior Publication Data

US 2007/0097538 A1 May 3, 2007

(30) Foreign Application Priority Data

Oct. 28, 2005 (KR) .................. 10-2005-0102506

(51) Int. Cl.
*G11B 15/46* (2006.01)
(52) U.S. Cl. .................... 360/73.03; 318/430
(58) Field of Classification Search .......... None
See application file for complete search history.

(56) References Cited

U.S. PATENT DOCUMENTS

| | | | |
|---|---|---|---|
| 2001/0043530 A1* | 11/2001 | Nakatsuka et al. | 369/53.1 |
| 2007/0176569 A1* | 8/2007 | Assar et al. | 318/268 |

FOREIGN PATENT DOCUMENTS

| | | |
|---|---|---|
| JP | 3-2157178 | 9/1991 |
| JP | 2002-5164 | 1/2002 |
| JP | 2003-131703 | 5/2003 |
| KR | 1997-0076672 | 11/1998 |
| KR | 2001-0105177 | 11/2001 |
| KR | 2002-0039235 | 5/2002 |
| KR | 2005-0012800 | 2/2005 |

\* cited by examiner

*Primary Examiner*—Andrew L. Sniezek
(74) *Attorney, Agent, or Firm*—Staas & Halsey LLP

(57) ABSTRACT

A method and apparatus for driving a spindle motor using adaptive feedforward control. The method includes: detecting a temperature of a drive; calculating a feedforward value corresponding to the detected temperature; and generating a first control signal that is a drive current according to a calculated feedforward value and applying the generated first control signal to the spindle motor.

21 Claims, 5 Drawing Sheets

METHOD AND APPARATUS FOR DRIVING SPINDLE MOTOR USING ADAPTIVE FEEDFORWARD CONTROL

CROSS-REFERENCE TO RELATED APPLICATION

This application claims the benefit of Korean Patent Application No. 10-2005-0102506, filed on Oct. 28, 2005, in the Korean Intellectual Property Office, the disclosure of which is incorporated herein by reference.

BACKGROUND OF THE INVENTION

1. Field of the Invention

The present invention relates to a disk drive, and more particularly, to a method for driving a spindle motor using adaptive feedforward control.

2. Description of Related Art

In general, digital data storage devices use disk drives having rotary rigid disks. The technologies related to a disk drive has been developed to increase storage capacity and accuracy of a disk drive while reducing the weight and power consumption of the disk drive. According to this development of technologies, precision control of a rotary disk has become more important.

According to a conventional technology, the speed of a spindle motor of a disk drive is maintained constant through standard control type feedback correction, that is, by supplying steady-state current to the spindle motor using a servo loop. The conventional spindle motor driving method using the feedback control is described below in detail.

A proportional integral digital controller that is typically of a firmware type transmits a control signal to a digital/analog converter. The digital/analog converter converts the control signal to an analog signal and transmits the converted analog signal to a motor pre-driver. The motor pre-driver controls the rotation speed of the spindle motor using the received control signal. Then, the actual speed of the spindle motor is measured by a digital counter and reflected in a speed signal. Next, the speed signal is deducted from a reference signal to generate a speed error signal. The speed error signal is fed back to the proportional integral digital controller so that the rotation speed of the spindle motor can be maintained at a target speed.

FIG. 1 is a graph showing the trace of the speed of a spindle motor at room temperature and extremely low temperature according to a conventional spindle motor driving method. In the graph of FIG. 1, the horizontal axis and the vertical axis denote the lapse of time and the rotation speed of the spindle motor, respectively.

As the temperature of the disk drive goes down below zero, the frictional force of a fluid bearing is gradually increased. In FIG. 1, it can be seen that, when the spindle motor is driven at a temperature lower than the room temperature, the rise of the rotation speed is delayed due to the increase of the frictional force of the spindle motor at around the target rotation speed. Also, when the temperature is extremely lower than the room temperature, a spin error SUM is sharply increased and saturated. A spin DAC indicated in the lower portion of the graph denotes the magnitude of a control signal that is proportional to the size of current applied to the spindle motor. It is noted that the spin DAC value decreases at the time point when the rotation speed of the spindle motor reaches a target RPM. This is because, when the rotation speed of the spindle motor reaches the target RPM, since the spindle motor is no longer accelerated and maintains a constant speed, large current is not needed.

FIG. 2 is a graph showing the case of the extremely low temperature of FIG. 1. In FIG. 2, it can be seen that the time for the spindle motor to reach the target rotation speed is remarkably increased in the low temperature environment than in the room temperature environment. This is because more current is required since the frictional force of the fluid bearing increases in the low temperature environment, and the time to reach the target rotation speed increases. Also, the spin speed error SUM of the controller is radically increased so that a phenomenon that the spin speed error SUM of the motor is saturated. Accordingly, the efficiency in driving of the motor is lowered.

Therefore, the conventional spindle motor driving method cannot prevent the increase of the time for the spindle motor to reach the target rotation speed when the frictional force of the fluid bearing changes according to the change of temperature in the driving environment when the spindle motor is driven. Accordingly, initial disk access time increases.

BRIEF SUMMARY

An aspect of the present invention provides a method for driving a spindle motor using adaptive feedforward control which realizes fast error correction, reduction of the time to reach a target rotation speed, and reduction of initial access time by adding an optimal feedforward value to the control input of a spindle motor according to the temperature of a disk drive.

An aspect of the present invention provides an apparatus for driving a spindle motor using adaptive feedforward control to which the above method is applied.

According to an aspect of the present invention, a method for driving a spindle motor using adaptive feedforward control is accomplished by detecting temperature of a drive, calculating a feedforward value corresponding to a detected temperature, and generating a first control signal that is drive current according to a calculated feedforward value and applying a generated first control signal to a spindle motor.

The method may further include detecting a rotation speed of the spindle motor to which the first control signal is applied and converting a detected rotation speed to a digital signal to generate a feedback signal, and generating a second control signal that is drive current based on a difference between a generated feedback signal and a speed signal corresponding to a target rotation speed, and applying a generated second control signal to the spindle motor with the first control signal.

According to another aspect of the present invention, an apparatus for driving a spindle motor using adaptive feedforward control in a drive including a spindle control portion generating a control signal of the spindle motor, includes a temperature detection portion detecting temperature of the drive, a feedforward value calculation portion calculating a feedforward value corresponding to a temperature detected by the temperature detection portion, and a feedforward value application portion generating a first control signal that is drive current of the spindle motor according to the feedforward value calculated by the feedforward value calculation portion and applying a generated first control signal to the spindle motor.

The apparatus may further include an analog/digital converter which detects a rotation speed of the spindle motor and converts a detected rotation speed to a digital signal to generate a feedback signal. The spindle control portion generates a second control signal that is drive current of the spindle motor based on a difference between a generated feedback signal of the analog/digital converter and a speed signal corresponding to a target rotation speed, and applying a generated second control signal to the spindle motor with the first control signal.

In the detecting of the temperature, the temperature of the drive may be directly detected using a temperature sensor included in the drive.

In the detecting of the temperature, the temperature of the drive may be calculated using a change of a spindle related control parameter value that is proportional to the temperature of the drive.

In the detecting of the temperature, a temperature detection function of a pre-amplifier that is included in the drive may be used.

In the calculating of the feedforward value, the feedforward value may be calculated by including a component that is proportional to the temperature of the drive.

The component that is proportional to the temperature of the drive may be obtained by an expression of $\beta \times T$, wherein $\beta$ is a proportional constant for conversion and $T$ is a temperature value of the drive.

The temperature detection portion may include a temperature sensor to directly detect the temperature of the drive.

The temperature detection portion may calculate the temperature of the drive using a change of a spindle related control parameter value that is proportional to the temperature of the drive.

The pre-amplifier may include a temperature detection function that is included in the drive is used and the temperature detection portion uses the temperature detection function of the pre-amplifier.

The feedforward value calculation portion may calculate the feedforward value by including a component that is proportional to the temperature of the drive.

The component that is proportional to the temperature of the drive may be obtained by an expression of $\beta \times T$, wherein $\beta$ is a proportional constant for conversion and $T$ is a temperature value of the drive.

The method for driving a spindle motor using adaptive feedforward control according to the present invention may be recorded on a computer readable recording medium that can read a program to be executed on a computer.

According to another aspect of the present invention, an apparatus for driving a spindle motor using adaptive feedforward control includes: a feedforward value calculation portion calculating a feedforward value corresponding to a detected temperature of a drive; and a feedforward value application portion generating a first control signal based on the calculated feedforward value and applying the first control signal to the spindle motor.

The apparatus may also include: an analog to digital converter converting a detected rotation speed of the spindle motor into a digital signal usable to generate a feedback signal; and a spindle control portion generating a second control signal based on a difference between the generated feedback signal and a speed signal corresponding to a target rotation speed of the spindle motor and applying the second control signal to the spindle motor.

The control signals may be a drive current of the spindle motor or a signal corresponding to the drive current of the spindle motor.

The feedforward value may be calculated using the following expression: $FF^* = \alpha \times DAC^*$, where $FF^*$ is a feedforward value at a particular temperature, $\alpha$ is a proportional constant, and $DAC^*$ is a DAC value at a particular temperature.

The expression $FF^* = \alpha \times DAC^*$ may be expressible with a second component that is not related to a first component and the temperature via the following expression: $FF^* = \beta \times T + \gamma + \alpha \times DAC_{normal}$, where $\beta$ is a proportional constant for conversion, $T$ is a temperature of the drive, $\gamma$ is a constant, and $DAC_{normal}$ is a DAC value used at normal temperature.

The temperature of the drive may be detected by a temperature detection section of a pre-amplifier in the drive.

Additional and/or other aspects and advantages of the present invention will be set forth in part in the description which follows and, in part, will be obvious from the description, or may be learned by practice of the invention.

BRIEF DESCRIPTION OF THE DRAWINGS

The above and/or other aspects and advantages of the present invention will become apparent and more readily appreciated from the following detailed description, taken in conjunction with the accompanying drawings of which.

DETAILED DESCRIPTION OF EMBODIMENTS

Figure 1:
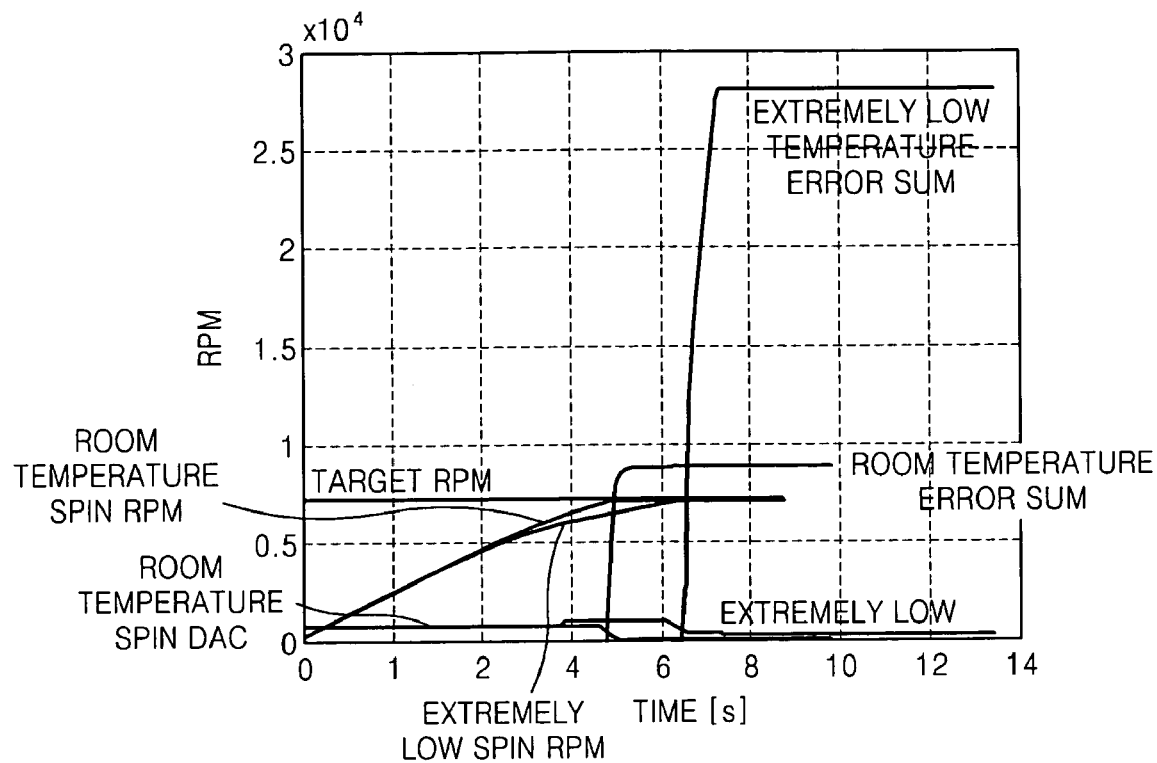
FIG. 1 is a graph showing the trace of the speed of a spindle motor at room temperature and extremely low temperature according to a conventional spindle motor driving method.

Reference will now be made in detail to the embodiments of the present invention, examples of which are illustrated in the accompanying drawings, wherein like reference numerals refer to the like elements throughout. The embodiments are described below to explain the present invention by referring to the figures.

The term "feedforward control" used in the description of embodiments of the present invention that follows signifies performing a correction operation in advance before the effect by external interference occurs in a control system. Since part of the minimum control input value needed to drive a motor is basically provided by applying feedforward control to a spindle motor, a fast error correction operation is performed and the time for the spindle motor to reach a target rotation speed can be reduced.

When the feedforward control is applied in the driving of the spindle motor at room temperature, a current value smaller than a driving current value in a normal state is used as a feedforward value. This is because the spindle motor can reach a target speed with a small overshoot. The frictional force of a bearing used for the spindle motor characteristically increases at low temperature different from at room temperature. In particular, for a fluid bearing, since such a characteristic is very dominant, the time for the spindle motor to reach the target speed tends to be greatly extended. Thus, the feedforward value must be variable according to the temperature.

Figure 3:
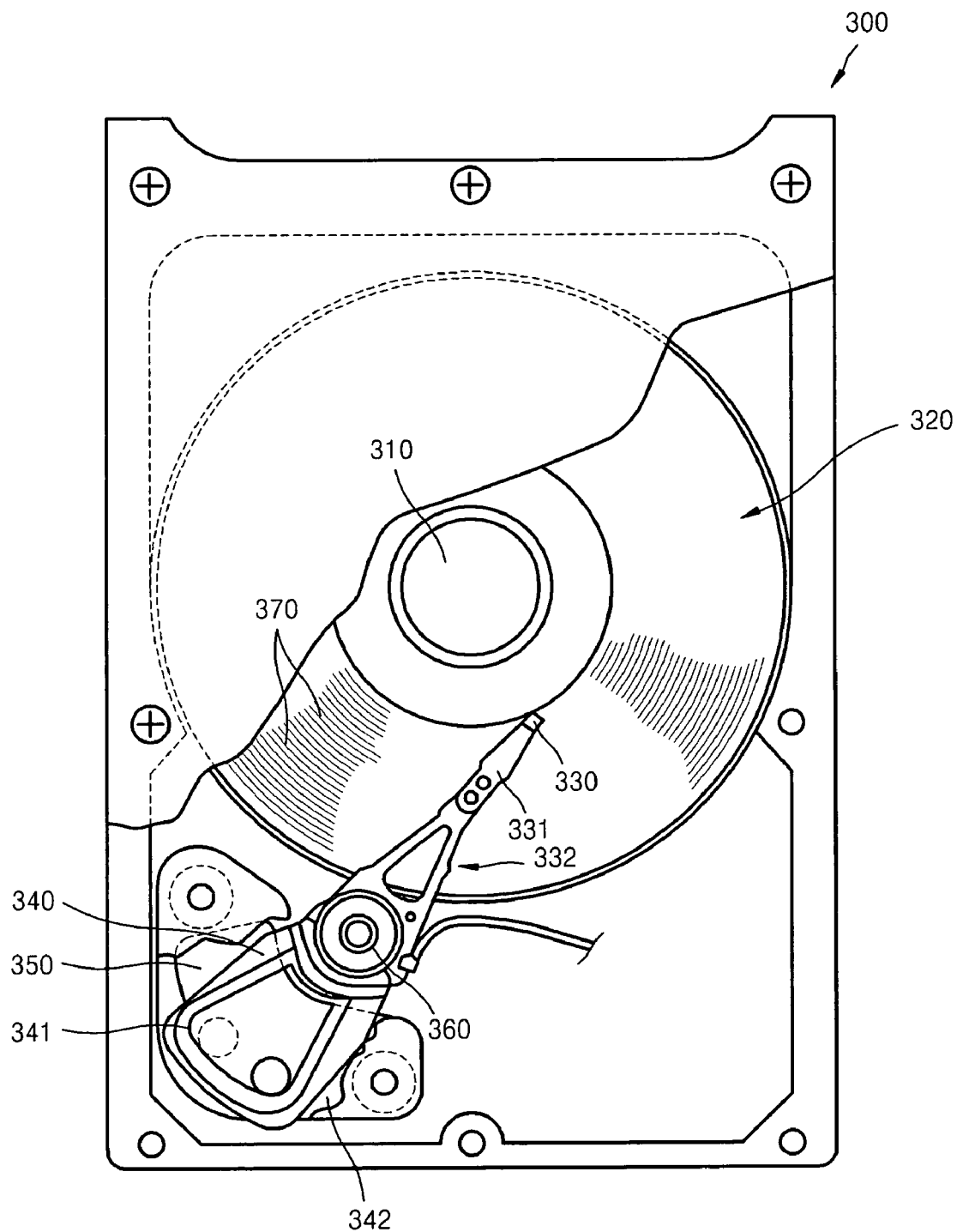
FIG. 3 is a view showing the configuration of a hard disk drive to which the present invention may be applied.

FIG. 3 shows the configuration of a hard disk drive 300 to which the present invention may be applied. Referring to FIG. 3, the hard disk drive 300 includes at least one magnetic disk 320 that is rotated by a spindle motor 310. The hard disk drive 300 also includes a head 330 located adjacent to a surface of the disk 320.

The head 330 can read or write information with respect to the disk 320 that is rotating, by detecting a magnetic field of the disk 320 and magnetizing the surface of the disk. Typically, the head 330 is coupled to the surface of the disk 320. Although a single head is illustrated in FIG. 3, the head 330 is to be understood to include a writing head for magnetizing the disk 320 and a reading head separated to detect the magnetic field of the disk 320. The reading head is formed of a magneto-resistive (MR) device.

The head 330 can be incorporated with a slider 331. The slider 331 generates air bearing between the head 330 and the surface of the disk 320. The slider 331 is coupled to a head gimbal assembly 332. The head gimbal assembly 332 is attached to an actuator arm 340 having a voice coil 341. The voice coil 341 is located adjacent to a magnetic assembly 350 which defines a voice coil motor (VCM). Current applied to the voice coil 341 generates torque to rotate the actuator arm 340 with respect to a bearing assembly 360. The actuator arm 340 rotates the head 330 across the surface of the disk 320.

Information is typically stored in a plurality of circular tracks 370 of the disk 320. Each track 370 includes a plurality of sectors. Each sector includes a data field and an identification field. The identification field consists of a gray code for identifying a sector from a track (cylinder). The head 330 moves across the surface of the disk 320 to read or write information with respect to another track.

Figure 4:
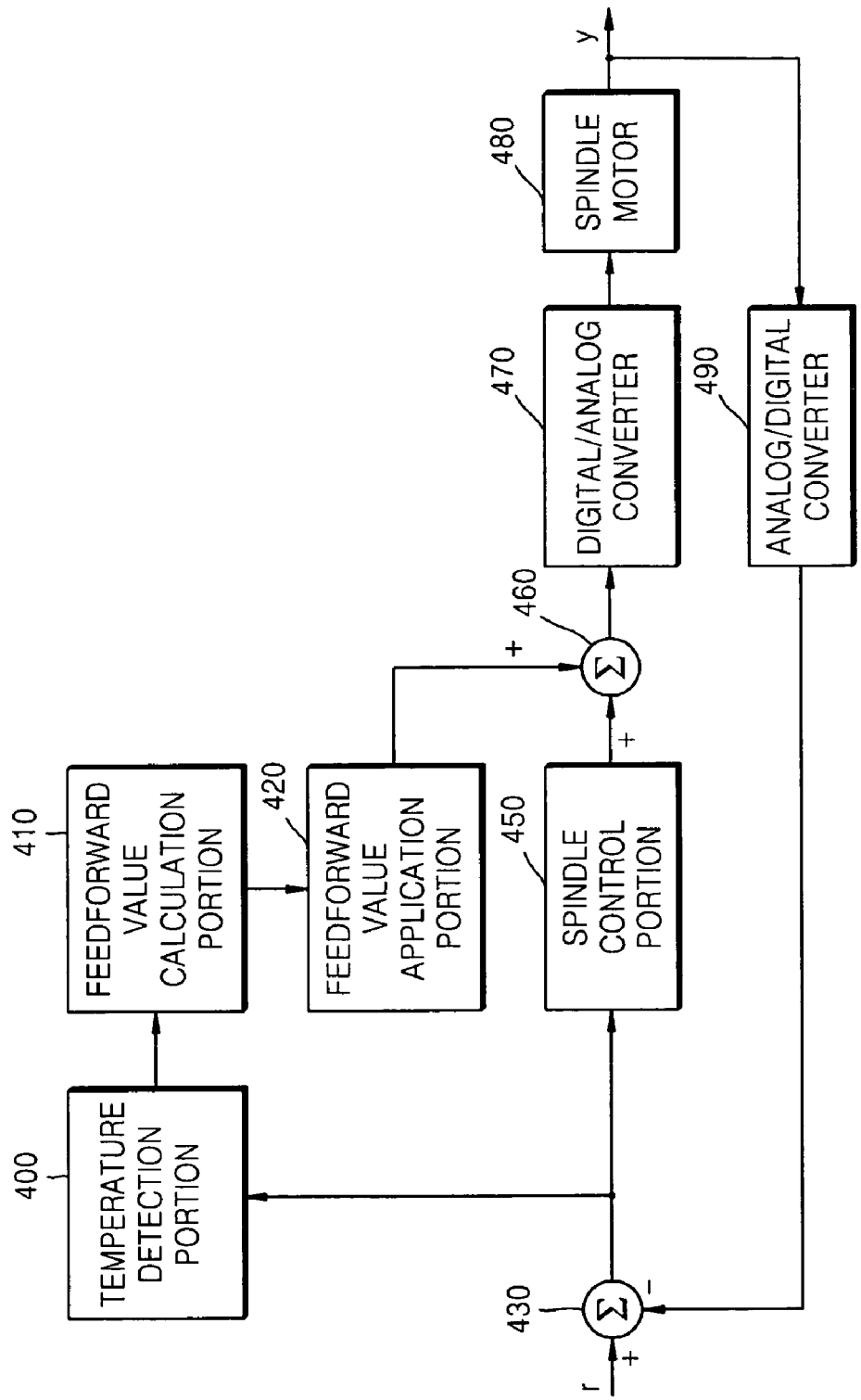
FIG. 4 is a block diagram of a spindle motor driving apparatus using adaptive feedforward control according to an embodiment of the present invention.

FIG. 4 is a block diagram of a spindle motor driving apparatus using adaptive feedforward control according to an embodiment of the present invention. Referring to FIG. 4, a temperature detection portion 400 detects the temperature of a drive. The temperature detection portion 400 may include a temperature sensor. The temperature sensor may be a digital thermometer and the amount of an output voltage of the temperature sensor may be proportional to the temperature of the drive. Also, the temperature detection portion 400 may receive an output value of a pre-amplifier (not shown) as input and may estimate the temperature of the drive by substituting the output value of the pre-amplifier in a predetermined calculation expression. Also, since the pre-amplifier included in the drive is generally provided with a temperature measuring function, the temperature sensor can be replaced by the pre-amplifier instead of separately including the temperature sensor.

A feedforward value calculation portion 410 calculates a value of feedforward corresponding to the temperature detected by the temperature detection portion 400. An example of the expression used to calculate the feedforward value at the feedforward value calculation portion 410 is as follows.

$$FF^* = \alpha \times DAC^* \quad \text{[Equation 1]}$$

Here, "$FF^*$" is a feedforward value at a particular temperature, "$\alpha$" is a proportional constant, and "$DAC^*$" is a DAC value at a particular temperature.

The above equation can be expressed with a second component that is not related to a first component and the temperature as follows.

$$FF^* = \beta \times T + \gamma + \alpha \times DAC_{normal} \quad \text{[Equation 2]}$$

Here, "$\beta$" is a proportional constant for conversion, "T" is a temperature of the drive, "$\gamma$" is a constant, and "$DAC_{normal}$" is a DAC value used at normal temperature.

The component including "$DAC_{normal}$" that is a feedforward value at the normal temperature is expressed as follows.

$$FF_{normal} = \alpha \times DAC_{normal} \quad \text{[Equation 3]}$$

Since the first component related to the temperature of the feedforward value is a linear expression with respect to temperature, the feedforward value at a particular temperature can be defined as a value proportional to the temperature.

However, the anticipation of the feedforward value according to the temperature is merely an example and is to be understood as definable as a quadratic function or higher function with respect to the temperature.

A feedforward value application portion 420 adds a feedforward FF value calculated at the feedforward value calculation portion 410 to a control signal of a spindle control portion 450. The control signal of the feedforward value application portion 420 is defined as a first control signal while the control signal of the spindle control portion 450 is defined as a second control signal. The first and second control signals are a drive current of a spindle motor 480 or a signal corresponding to the drive current.

A subtractor 430 obtains a difference between a spindle control signal r and a speed signal indicating the actual speed of the spindle motor 480 and generates an error signal. The spindle control portion 450 determines whether to accelerate the spindle motor 480 using an error signal amplified by the pre-amplifier 440, and generates and outputs a control signal corresponding to the determination of the acceleration of the spindle motor 480. An adder 460 adds the feedforward value output from the feedforward value application portion 420 to the control signal output from the spindle control portion 450 and generates one complete spindle motor control signal.

A digital/analog converter 470 converts the spindle motor control signal output from the adder 460 to an analog signal and applies the converted signal to the spindle motor 480 in form of current. The spindle motor 480 is rotated by the spindle motor control signal applied by the digital/analog converter 470 to rotate a disk connected to the spindle motor 480. The analog/digital converter 490 converts the speed signal corresponding to the rotation speed of the spindle motor 480 to a digital signal and transmits the converted signal to the subtractor 430.

Figure 5A:
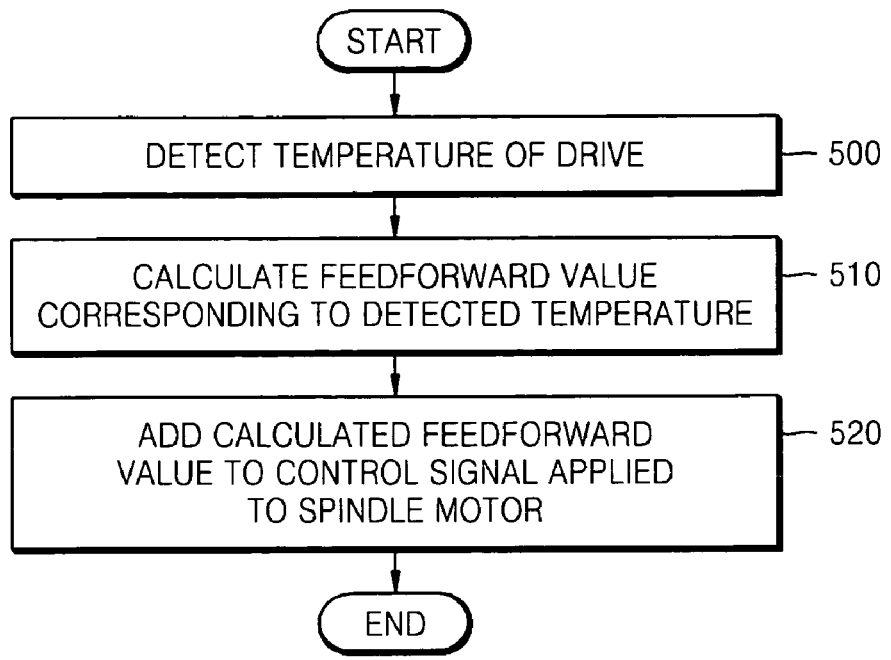
FIG. 5A is a flowchart for explaining a spindle motor driving method using adaptive feedforward control according to an embodiment of the present invention.

FIG. 5A is a flowchart for explaining a spindle motor driving method using adaptive feedforward control according to an embodiment of the present invention. Referring to FIG. 5A, first, the temperature of a drive is detected (Operation 500). In the operation of detecting the temperature, the temperature of the drive is directly detected using the temperature sensor included in the drive or calculated using a change in a spindle related control parameter value that is proportional to the temperature of the drive. The spindle related parameter may be a pre-amplifier parameter of a control loop including the spindle motor.

The feedforward value corresponding to the detected temperature is calculated (Operation 510). The feedforward value calculation operation is the same as that described above in the description of the feedforward value calculation portion 410 of FIG. 4.

The calculated feedforward value is added to the control signal applied to the spindle motor (Operation 520). The addition of the feedforward value according to the temperature to the control signal is to perform faster error correction operation by appropriately supplying part of the minimum control input value needed for motor driving even when the temperature changes and thus a friction characteristic of a fluid bearing changes. Accordingly, the time for the spindle motor to reach a target rotation speed can be reduced.

The added control signal is applied to the spindle motor; the control signal can include the above-described first and second control signals. The control signal by feedback and the control signal according to the feedforward value are applied to the spindle motor. Since the feedforward value is proportional to the temperature, the current applied to the spindle motor can be optimized even when the temperature changes.

Figure 5B:
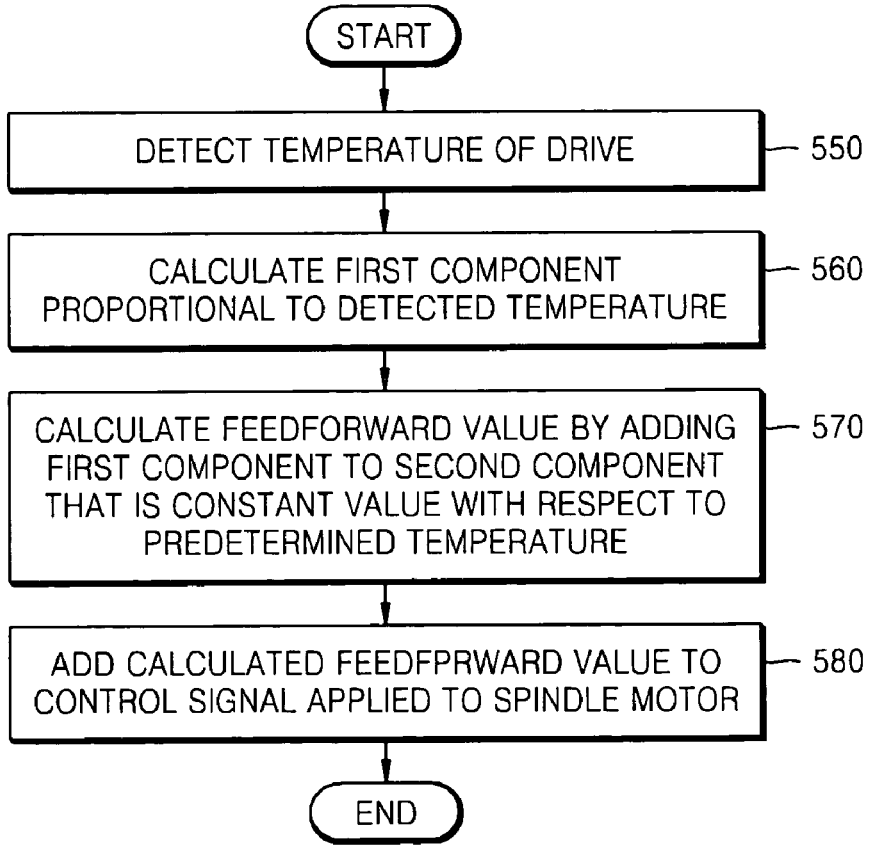
FIG. 5B is a flowchart for explaining a spindle motor driving method using adaptive feedforward control according to another embodiment of the present invention.

FIG. 5B is a flowchart for explaining a spindle motor driving method using adaptive feedforward control according to another embodiment of the present invention. Referring to FIG. 5B, first, the temperature of the drive is detected (Operation 550). In the operation of detecting a temperature, the temperature of the drive is directly detected using the temperature sensor included in the drive. The temperature of the drive can be calculated using a change in the spindle-related control parameter value that is proportional to the temperature of the drive. The spindle motor related parameter may be a pre-amplifier parameter of a control loop including the spindle motor.

Next, the first component that is proportional to the detected temperature is calculated (Operation 560). The first component can be obtained from an expression "β×T" and "β" is a proportional constant for conversion and "T" is a temperature value of the drive. Also, the first component can be obtained from a quadratic or higher function with respect to the temperature.

When the first component is calculated, a feedforward value that is optimized to the temperature of the drive is calculated by adding the second component that is preset as a constant value with respect to a predetermined temperature to the first component (Operation 570). The second component is a constant value including a DAC value used at the normal temperature. The step of calculating the feedforward value is the same as that of the feedforward value calculation portion 410 of FIG. 4.

The calculated feedforward value is added to the control signal applied to the spindle motor (Operation 520). The added control signal can include the above-described first and second control signals. The control signal according to the feedforward value is defined as the first control signal and the control signal that is not related to the feedforward value is defined as the second control signal. The first and second control signals are drive current of the spindle motor or a signal corresponding to the drive current. The added control signal is applied to the spindle motor.

Figure 6:
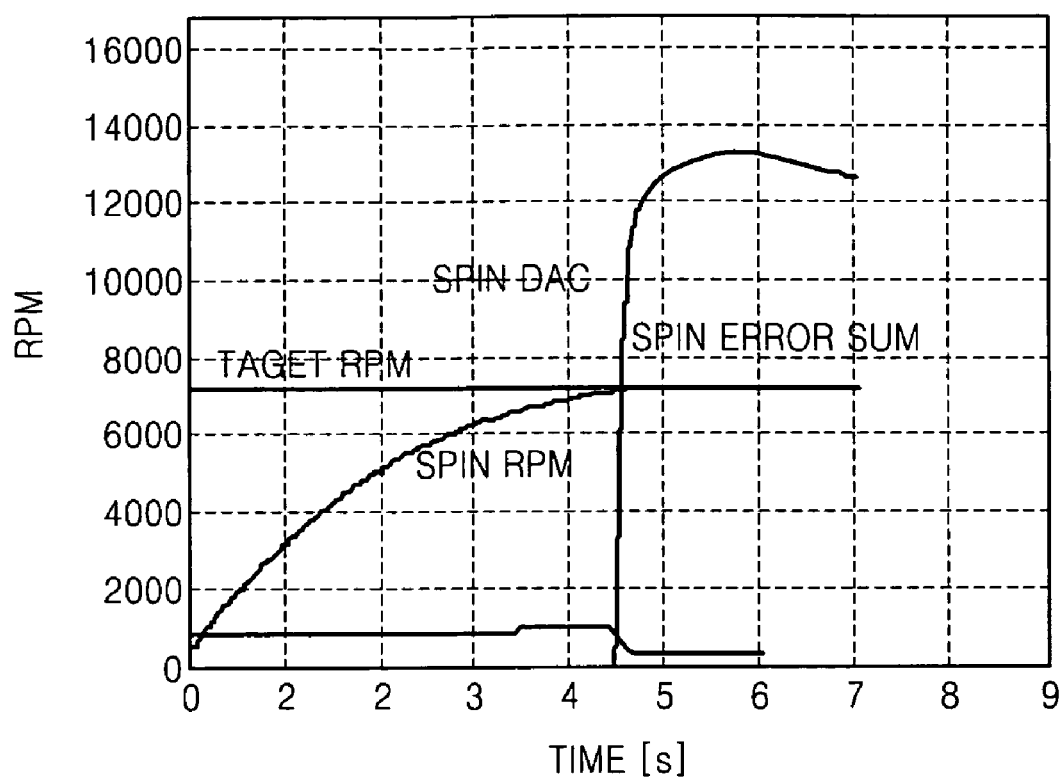
FIG. 6 is a graph showing the trace of the speed of a spindle motor to which the present invention may be applied.

FIG. 6 is a graph showing the trace of the speed of a spindle motor to which the present invention may be applied. Here, the horizontal axis and the vertical axis are the lapse of time and the rotation speed of the spindle motor, respectively.

Figure 2:
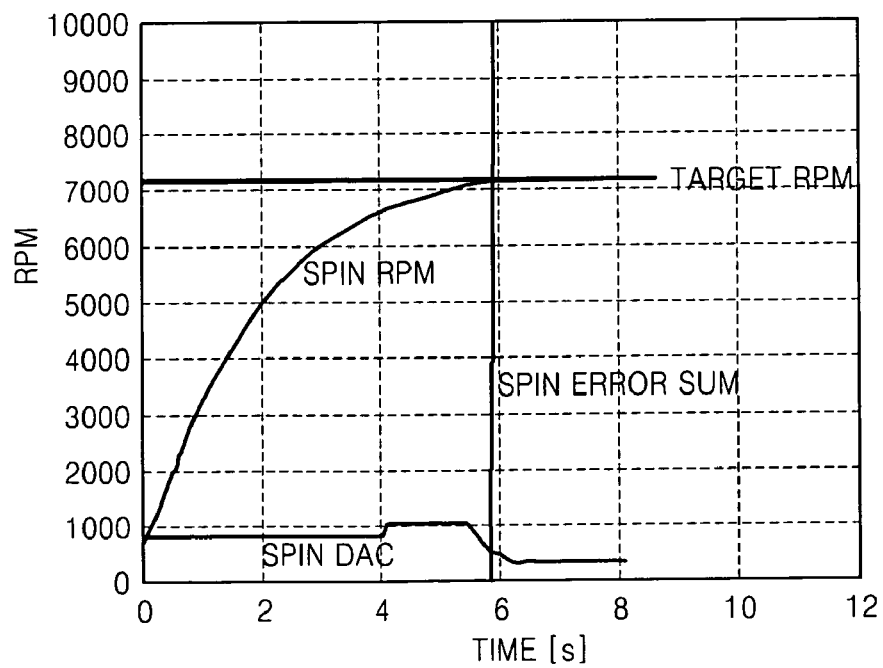
FIG. 2 is a graph showing the case of the extremely low temperature of FIG. 1.

Referring to FIG. 6, it can be seen that, compared to FIGS. 1 and 2, the time that the rotation speed of the spindle motor reaches the target rotation speed is reduced by about 1 or 2 seconds and that the spin speed error SUM is considerably reduced.

According to the above-described embodiments of the present invention, since the spindle motor is controlled by a control signal generated by adding an optimal feedforward value according to the temperature of the drive to the control input of the spindle motor, when the frictional force of the fluid bearing changes according to the change of a driving environment during the driving of the spindle motor, the increase in the time for the spindle motor to reach the target rotation speed is prevented so that the initial disk access time is shortened.

Embodiments of the present invention can be executed through software. When the software is executed, the constituent elements of the present invention are code segments which perform necessary jobs. The program or code segments can be transmitted by being stored in a processor readable medium or by a computer data signal coupled to a carrier wave in a communications network.

Although a few embodiments of the present invention have been shown and described, the present invention is not limited to the described embodiments. Instead, it would be appreciated by those skilled in the art that changes may be made to these embodiments without departing from the principles and spirit of the invention, the scope of which is defined by the claims and their equivalents.

What is claimed is:

1. A method of driving a spindle motor using adaptive feedforward control, the method comprising:
    detecting a temperature of a drive;
    calculating a feedforward value corresponding to the detected temperature; and
    generating a first control signal that is a drive current according to a calculated feedforward value and applying the generated first control signal to the spindle motor.

2. The method as claimed in claim 1, further comprising:
    detecting a rotation speed of the spindle motor to which the first control signal is applied and converting the detected rotation speed to a digital signal usable to generate a feedback signal; and
    generating a second control signal that is a drive current based on a difference between a generated feedback signal and a speed signal corresponding to a target rotation speed, and applying the generated second control signal to the spindle motor with the first control signal.

3. The method as claimed in claim 1, wherein, in the detecting a temperature, the temperature of the drive is directly detected using a temperature sensor in the drive.

4. The method as claimed in claim 1, wherein, in the detecting a temperature, the temperature of the drive is calculated using a change of a spindle related control parameter value that is proportional to the temperature of the drive.

5. The method as claimed in claim 1, wherein, in the detecting a temperature, a temperature detection function of a pre-amplifier in the drive is used.

6. The method as claimed in claim 1, wherein, in the calculating a feedforward value, the feedforward value is calculated by including a component that is proportional to the temperature of the drive.

7. The method as claimed in claim 6, wherein the component that is proportional to the temperature of the drive is obtained by an expression of β×T, and
    wherein β is a proportional constant for conversion and T is a temperature value of the drive.

8. An apparatus for driving a spindle motor using adaptive feedforward control in a drive including a spindle control portion generating a control signal of the spindle motor, the apparatus comprising:
    a temperature detection portion detecting a temperature of the drive;
    a feedforward value calculation portion calculating a feedforward value corresponding to the temperature detected by the temperature detection portion; and
    a feedforward value application portion generating a first control signal that is a drive current of the spindle motor according to the feedforward value calculated by the feedforward value calculation portion and applying the generated first control signal to the spindle motor.

9. The apparatus as claimed in claim 8, further comprising an analog/digital converter which detects a rotation speed of the spindle motor and converts the detected rotation speed to a digital signal usable to generate a feedback signal, wherein the spindle control portion generates a second control signal that is a drive current of the spindle motor based on a difference between a generated feedback signal of the analog/digital converter and a speed signal corresponding to a target rotation speed, and applying a generated second control signal to the spindle motor with the first control signal.

10. The apparatus as claimed in claim 8, wherein the temperature detection portion comprises a temperature sensor to directly detect the temperature of the drive.

11. The apparatus as claimed in claim 8, wherein the temperature detection portion calculates the temperature of the drive using a change of a spindle related control parameter value that is proportional to the temperature of the drive.

12. The apparatus as claimed in claim 8, wherein the pre-amplifier includes the temperature detection section and is in the drive, and wherein the temperature detection portion uses a temperature detection function of the temperature detection section to detect the temperature of the drive.

13. The apparatus as claimed in claim 8, wherein the feedforward value calculation portion calculates the feedforward value by including a component that is proportional to the temperature of the drive.

14. The apparatus as claimed in claim 13, wherein the component that is proportional to the temperature of the drive is obtained by an expression of $\beta \times T$, wherein $\beta$ is a proportional constant for conversion and T is a temperature value of the drive.

15. An apparatus for driving a spindle motor using adaptive feedforward control, the apparatus comprising:

a feedforward value calculation portion calculating a feedforward value corresponding to a detected temperature of a drive; and a feedforward value application portion generating a first control signal based on the calculated feedforward value and applying the first control signal to the spindle motor.

16. The apparatus of claim 15, further comprising:

an analog to digital converter converting a detected rotation speed of the spindle motor into a digital signal usable to generate a feedback signal; and a spindle control portion generating a second control signal based on a difference between the generated feedback signal and a speed signal corresponding to a target rotation speed of the spindle motor and applying the second control signal to the spindle motor.

17. The apparatus of claim 16, wherein the control signals are a drive current of the spindle motor or a signal corresponding to the drive current of the spindle motor.

18. The apparatus of claim 15, wherein the feedforward value is calculated using the following expression:

$$FF^* = \alpha \times DAC^*, \text{ and}$$

wherein $FF^*$ is a feedforward value at a particular temperature, $\alpha$ is a proportional constant, and $DAC^*$ is a DAC value at a particular temperature.

19. The apparatus of claim 18, wherein the expression $FF^* = \alpha \times DAC^*$ is expressible with a second component that is not related to a first component and the temperature via the following expression:

$$FF^* = \beta \times T + \gamma + \alpha \times DAC_{normal}, \text{ and}$$

wherein $\beta$ is a proportional constant for conversion, T is a temperature of the drive, $\gamma$ is a constant, and $DAC_{normal}$ is a DAC value used at normal temperature.

20. The apparatus of claim 15, wherein the temperature of the drive is detected by a temperature detection section of a pre-amplifier in the drive.

21. A computer-readable storage medium encoded with processing instructions for causing a processor to execute a method of driving a spindle motor using adaptive feedforward control, the method comprising:

detecting a temperature of a drive;

calculating a feedforward value corresponding to the detected temperature; and generating a first control signal that is a drive current according to a calculated feedforward value and applying the generated first control signal to the spindle motor.

* * * * *